US012580321B2

(12) United States Patent
Wu et al.

(10) Patent No.: US 12,580,321 B2
(45) Date of Patent: Mar. 17, 2026

(54) RECONFIGURABLE SURFACE AND MANUFACTURING METHOD THEREOF

(71) Applicant: Innolux Corporation, Miaoli County (TW)

(72) Inventors: Yan-Zheng Wu, Miaoli County (TW); Yung-Wei Chen, Miaoli County (TW); Chen-Lin Yeh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 4 days.

(21) Appl. No.: 18/602,036

(22) Filed: Mar. 12, 2024

(65) Prior Publication Data

US 2024/0356234 A1 Oct. 24, 2024

Related U.S. Application Data

(60) Provisional application No. 63/460,316, filed on Apr. 19, 2023.

(30) Foreign Application Priority Data

Jan. 8, 2024 (CN) ......................... 202410024585.4

(51) Int. Cl.

*H01Q 3/26* (2006.01)
*G02F 1/13* (2006.01)
*H01Q 3/44* (2006.01)
*H01Q 15/00* (2006.01)

(52) U.S. Cl.

CPC ............. *H01Q 15/002* (2013.01); *H01Q 3/44* (2013.01)

(58) Field of Classification Search

CPC ........ H01Q 15/00; H01Q 15/002; H01Q 3/44; H01Q 1/38; G02F 1/133; G02F 1/1337

See application file for complete search history.

(56) References Cited

U.S. PATENT DOCUMENTS

| | | | | |
|---|---|---|---|---|
| 6,396,440 | B1 * | 5/2002 | Chen | H01Q 3/26 343/768 |
| 6,822,622 | B2 * | 11/2004 | Crawford | H01Q 3/44 343/756 |
| 9,158,077 | B2 * | 10/2015 | Huang | G02B 6/1245 |
| 10,795,209 | B2 * | 10/2020 | Wang | G02F 1/1343 |
| 12,294,157 | B2 * | 5/2025 | Yang | H01Q 15/0013 |

FOREIGN PATENT DOCUMENTS

| | | | | |
|---|---|---|---|---|
| CN | 111273467 A | * | 6/2020 | G02F 1/0136 |
| WO | 2022096002 | | 5/2022 | |

* cited by examiner

*Primary Examiner* — Tho G Phan
(74) *Attorney, Agent, or Firm* — JCIPRNET

(57) ABSTRACT

Disclosed is a reconfigurable surface configured to modulate a phase of an electromagnetic wave. The reconfigurable surface includes a first substrate, a plurality of modulating units, and a ground signal layer. The plurality of modulating units are disposed on the first substrate. One of the plurality of modulating units includes a first electrode, a second electrode, and a modulating medium. The first electrode is disposed on the first substrate. The second electrode is disposed adjacent to the first electrode. The modulating medium is located between the first electrode and the second electrode. The ground signal layer is disposed under the first substrate. A manufacturing method of a reconfigurable surface is also provided.

16 Claims, 10 Drawing Sheets

RECONFIGURABLE SURFACE AND MANUFACTURING METHOD THEREOF

CROSS-REFERENCE TO RELATED APPLICATION

This application claims the priority benefits of U.S. provisional application Ser. No. 63/460,316, filed on Apr. 19, 2023 and China application serial no. 202410024585.4, filed on Jan. 8, 2024. The entirety of each of the above-mentioned patent applications is hereby incorporated by reference herein and made a part of this specification.

BACKGROUND

Technical Field

The disclosure relates to an electronic device, and in particular to a reconfigurable surface and a manufacturing method thereof.

Description of Related Art

The reconfigurable intelligent surface (RIS) technology has the ability to redirect electromagnetic waves (such as millimeter waves) and can improve the issue of communication blind spots. Therefore, how to create a RIS structure has become one of the goals of research and development personnel.

SUMMARY

The disclosure provides a reconfigurable surface and a manufacturing method thereof, which can redirect electromagnetic waves.

In an embodiment of the disclosure, a reconfigurable surface is configured to modulate a phase of an electromagnetic wave. The reconfigurable surface includes a first substrate, multiple modulating units, and a ground signal layer. The modulating units are disposed on the first substrate. One of the modulating units includes a first electrode, a second electrode, and a modulating medium. The first electrode is disposed on the first substrate. The second electrode is disposed adjacent to the first electrode. The modulating medium is located between the first electrode and the second electrode. The ground signal layer is disposed under the first substrate.

In another embodiment of the disclosure, a manufacturing method of a reconfigurable surface includes forming a modulating structure, forming a circuit structure, and joining the modulating structure to the circuit structure by a welding part. Forming the modulating structure includes providing a first substrate, forming a first electrode and a second electrode on the first substrate, and forming a modulating medium between the first electrode and the second electrode. Forming the circuit structure includes providing a second substrate and forming a ground signal layer on the second substrate.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
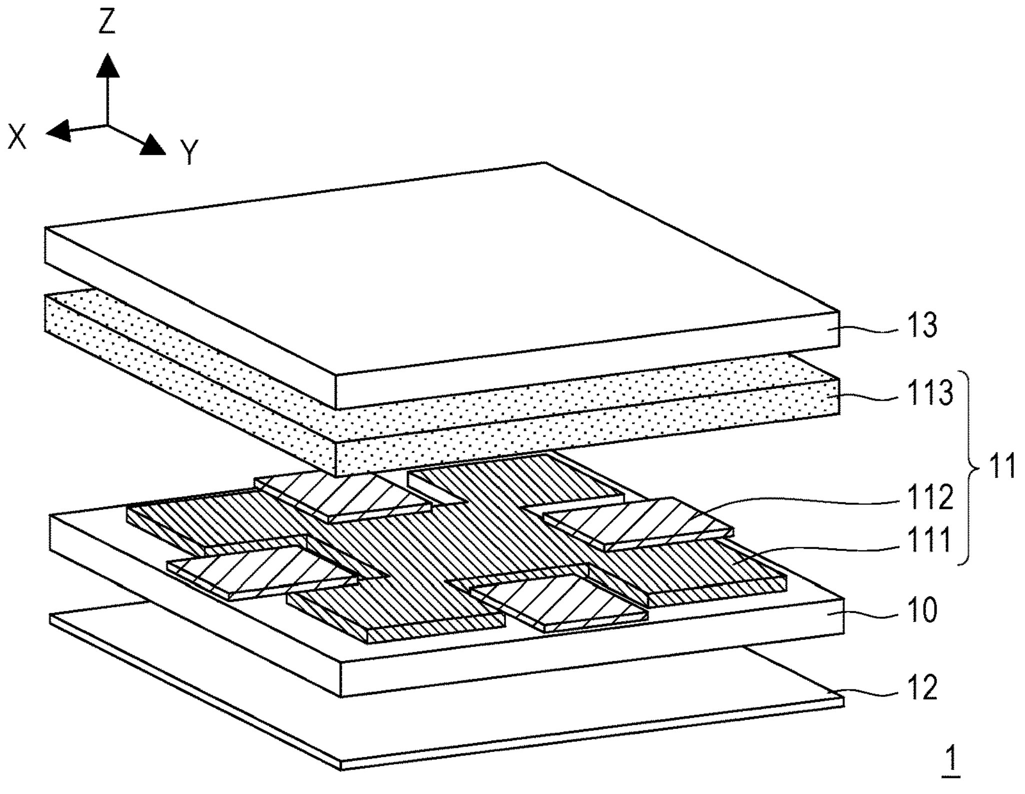
FIG. 1 is a partial schematic exploded view of a reconfigurable surface according to a first embodiment of the disclosure.

Reference will now be made in detail to the exemplary embodiments of the disclosure, examples of which are illustrated in the accompanying drawings. Whenever possible, the same reference numerals are used in the drawings and descriptions to represent the same or similar portions.

Certain terms are used throughout the specification and the appended claims of the disclosure to refer to particular elements. Those skilled in the art should understand that electronic device manufacturers may refer to the same elements under different names. This specification does not intend to distinguish between elements having the same function but different names. In the following specification and claims, words such as "including" and "containing" are open words, so they should be interpreted as meaning "including but not limited to . . . "

Terms such as "upper", "lower", "front", "rear", "left", and "right" mentioned in the specification are directions referring to the drawings. Therefore, the directional terms used are used for illustration, but not for limiting the disclosure. In the drawings, each drawing depicts general features of methods, structures, and/or materials used in specific embodiments. However, these drawings should not be construed to define or limit the scope or nature covered by these embodiments. For example, for clarity, the relative size, thickness, and position of each film, region, and/or structure may be reduced or enlarged.

One structure (or layer, element, substrate) described in the disclosure as being located on/above another structure (or layer, element, substrate) may mean that the two structures are adjacent and directly connected or may mean that the two structures are adjacent but not directly connected. Indirect connection means that there is at least one intermediate structure (or intermediate layer, intermediate element, intermediate substrate, intermediate space) between two structures. The lower surface of one structure is adjacent or directly connected to the upper surface of the intermediate structure, and the upper surface of the other structure is adjacent or directly connected to the lower surface of the intermediate structure. The intermediate structure may be formed by a single-layer or multi-layer physical structure or non-physical structure without limitation. In the disclosure, when a certain structure is disposed "on" another structure, it may mean that the certain structure is "directly" on the other structure or that the certain structure is "indirectly" on the other structure. That is, at least one structure is sandwiched between the certain structure and the other structure.

The terms "about", "substantially", or "roughly" are generally interpreted as being within 10% of a given value or range or interpreted as being within 5%, 3%, 2%, 1%, or 0.5% of the given value or range. In addition, the terms "a range is a first value to a second value" and "a range is between a first value and a second value" mean that the range includes the first value, the second value, and other values in between.

The ordinal numbers such as "first" and "second" used in the specification and claims are used to modify an element. They do not themselves imply and represent that the element (s) have any previous ordinal number, and also do not represent the order of one element and another element or the order of a manufacturing method. The use of these ordinal numbers is to clearly distinguish an element with a certain name from another element with the same name. The same terms may not be used in the claims and the specification. Accordingly, a first component in the specification may be a second component in the claims.

The electrical connection or coupling described in the disclosure may refer to direct connection or indirect connection. In the case of direct connection, endpoints of elements on two circuits are directly connected or connected to each other by a conducting line segment. In the case of indirect connection, there is a switch, diode, capacitor, inductor, resistor, other suitable elements, or a combination of the elements between the endpoints of the elements on the two circuits, but the disclosure is not limited thereto.

In the disclosure, the thickness, length, and width may be measured using an optical microscope (OM), and the thickness or width may be measured from a cross-sectional image in an electron microscope, but the disclosure is not limited thereto. In addition, any two values or directions for comparison may have certain errors. In addition, the term "the given range is the first value to the second value", "the given range falls within the range of the first value to the second value", or "the given range is between the first value and the second value" means that the given range includes the first value, the second value, and other values in between. If a first direction is perpendicular to a second direction, an angle between the first direction and the second direction may be between 80 degrees and 100 degrees. If the first direction is parallel to the second direction, the angle between the first direction and the second direction may be between 0 degrees and 10 degrees.

Unless otherwise defined, all terms (including technical and scientific terms) used herein have the same meaning as commonly understood by those skilled in the art to which the disclosure belongs. It should be understood that, these terms, such as those defined in commonly used dictionaries, should be interpreted as having meaning consistent with the relevant art and the background or context of the disclosure, and should not be interpreted in an idealized or excessively formal way, unless specifically defined in an embodiment of the disclosure.

In the disclosure, an electronic device may include a display device, a backlight device, an antenna device, a packaging device, a sensing device, or a splicing device, but the disclosure is not limited thereto. The electronic device may be a bendable or flexible electronic device. The display device may be a non-self-luminous type display device or a self-luminous type display device. The display device may include, for example, liquid crystal, a light emitting diode, fluorescence, phosphor, quantum dot (QD), other suitable display media, or a combination thereof.

The antenna device may, for example, include a reconfigurable intelligent surface (RIS), a frequency selective surface (FSS), a radio frequency (RF) filter, a polarizer, a resonator, an antenna, etc. The antenna may be a liquid crystal type antenna. The sensing device may be a sensing device sensing capacitance, light, heat, or ultrasound, but the disclosure is not limited thereto. In the disclosure, the electronic device may include an electronic element. The electronic element may include a passive element and an active element, such as a capacitor, a resistor, an inductor, a diode, a transistor, and so on. The diode may include a light emitting diode, a varactor diode, or a photodiode. The light emitting diode may include, for example, an organic light emitting diode (OLED), a mini LED, a micro LED, or a quantum dot LED, but the disclosure is not limited thereto. The splicing device may be, for example, a display splicing device or an antenna splicing device, but the disclosure is not limited thereto. It should be noted that the electronic device may be any combination thereof, but the disclosure is not limited thereto. The packaging device may be adaptable for a wafer-level package (WLP) technology or a panel-level package (PLP) technology, such as a packaging device with a chip first process or a redistribution layer (RDL) first process. In addition, the shape of the electronic device may be rectangular, circular, polygonal, a shape with curved edges, or other suitable shapes. The electronic device may have a peripheral system, such as a driving system, a control system, and a light source system to support the display device, the antenna device, a wearable device (such as including augmented reality or virtual reality), a vehicle-mounted device (such as including a car windshield), or the splicing device.

It should be noted that in the following embodiments, the features in several different embodiments may be replaced, recombined, and mixed to complete other embodiments without departing from the spirit of the disclosure. As long as the features between the embodiments do not violate the spirit of the disclosure or conflict with one another, they may be mixed and used arbitrarily.

Figure 2:
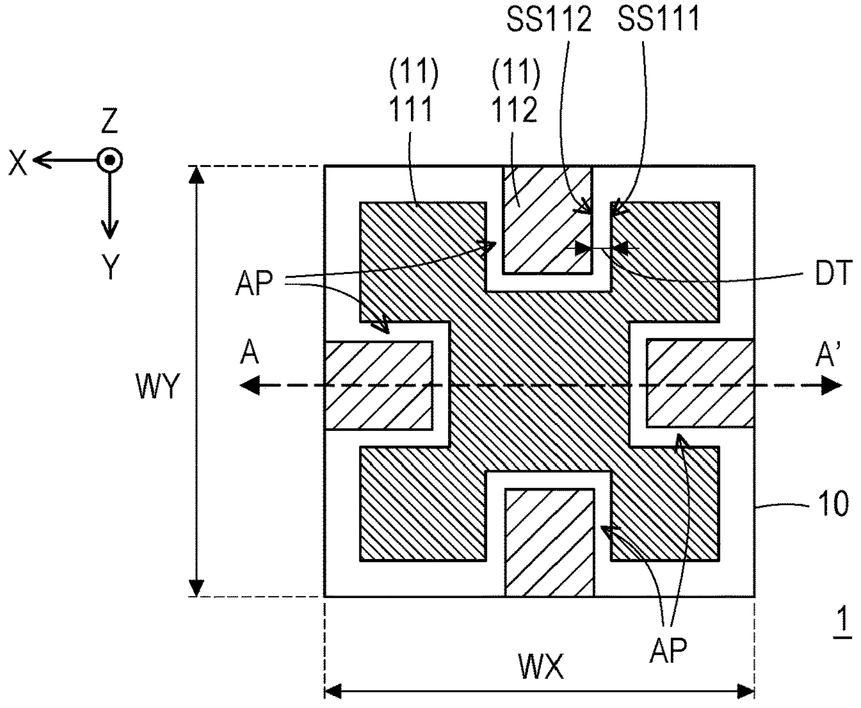
FIG. 2 is a schematic top view of the reconfigurable surface in FIG. 1.
Figure 3:
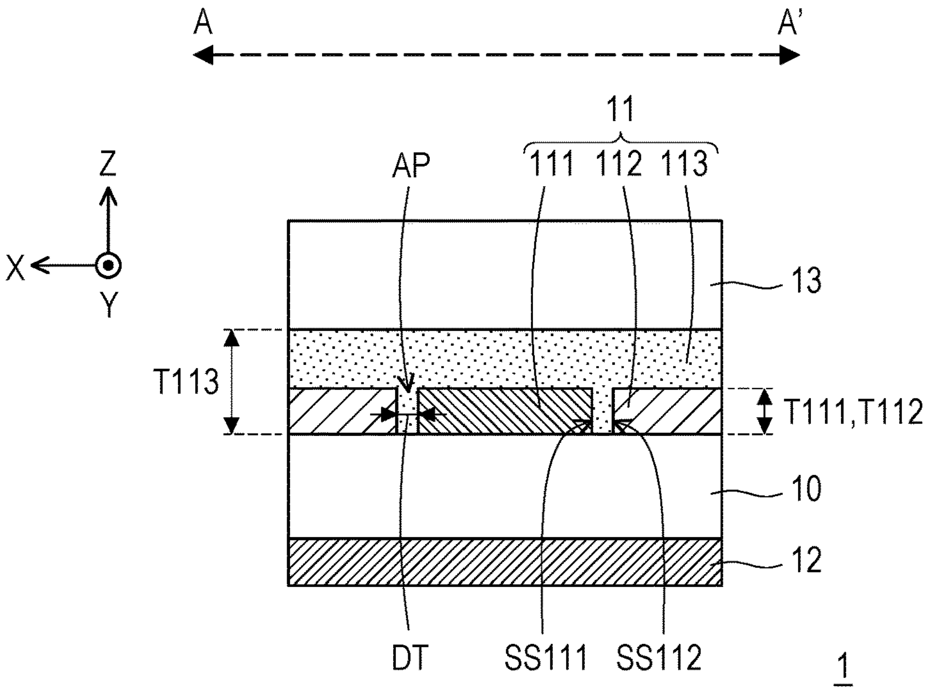
FIG. 3 is a schematic cross-sectional view corresponding to a sectional line A-A' in FIG. 2.
Figure 8:
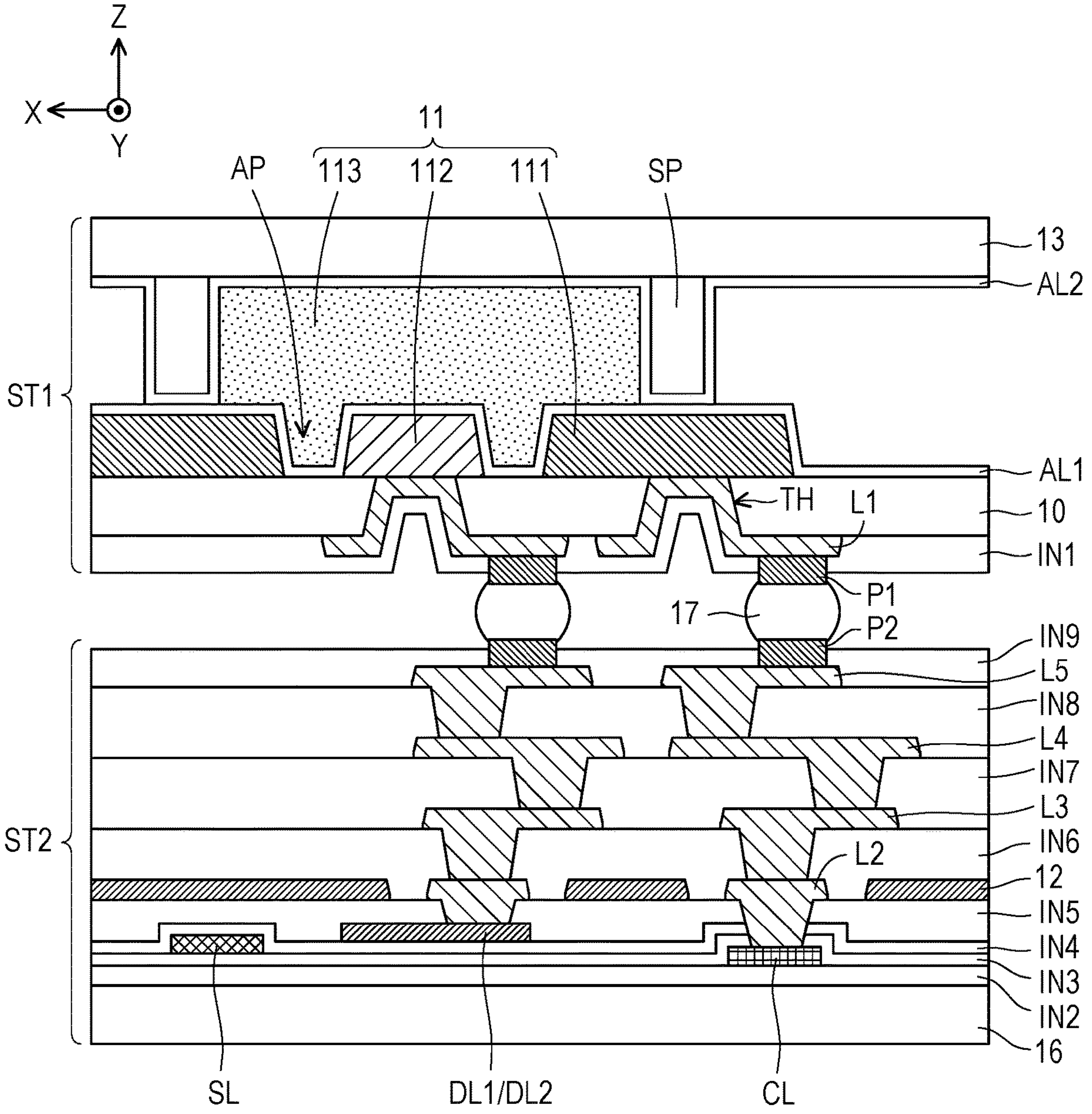
FIG. 8 is a partial schematic cross-sectional view of other types of reconfigurable surfaces according to the first embodiment.
Figure 9:
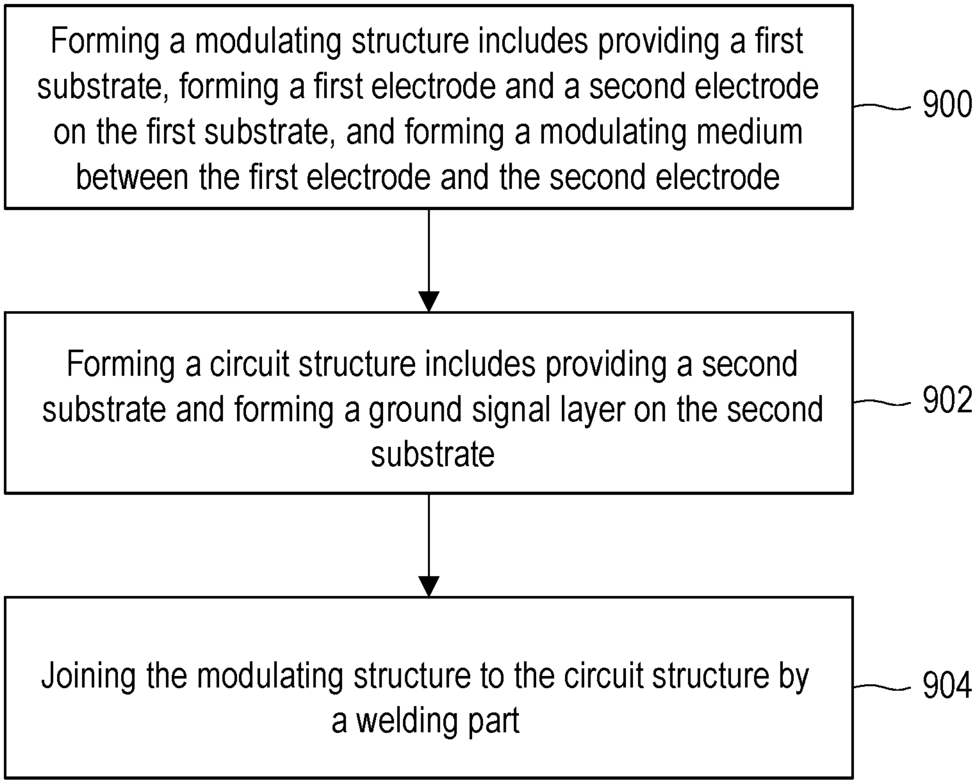
FIG. 9 is a flow chart of a manufacturing method of a reconfigurable surface according to the first embodiment of the disclosure.

FIG. 1 is a partial schematic exploded view of a reconfigurable surface according to a first embodiment of the disclosure. FIG. 2 is a schematic top view of the reconfigurable surface in FIG. 1. FIG. 3 is a schematic cross-sectional view corresponding to a sectional line A-A' in FIG. 2. FIG. 4 to FIG. 7 are schematic top views of other types of reconfigurable surfaces according to the first embodiment. FIG. 8 is a partial schematic cross-sectional view of other types of reconfigurable surfaces according to the first embodiment. FIG. 9 is a flow chart of a manufacturing method of a reconfigurable surface according to the first embodiment of the disclosure.

Referring first to FIG. 1, a reconfigurable surface 1 may be configured to modulate a phase of an electromagnetic wave (not shown). The reconfigurable surface 1 may include a first substrate 10, multiple modulating units 11 (only one is schematically shown in FIG. 1), and a ground signal layer 12. The modulating units 11 are disposed on the first substrate 10. One of the modulating units 11 may include a first electrode 111, a second electrode 112, and a modulating medium 113. The first electrode 111 is disposed on the first substrate 10. The second electrode 112 is disposed adjacent to the first electrode 111. The modulating medium 113 is located between the first electrode 111 and the second electrode 112. The ground signal layer 12 is disposed under the first substrate 10.

Specifically, the first substrate 10 is configured to carry an element. The first substrate 10 may be a flexible substrate or an inflexible substrate. For example, the first substrate 10 may include a glass substrate, a polymer substrate, a printed circuit board, a base layer formed by ceramics, or a combination thereof, but the disclosure is not limited thereto.

The modulating units 11 may be arranged in an array on the first substrate 10. For example, the modulating units 11 may be arranged in the array along a first direction (such as an X direction) and a second direction (such as a Y direction). The first direction (such as the X direction) and the second direction (such as the Y direction) are both perpendicular to a thickness direction (such as a Z direction) of the reconfigurable surface 1, and the first direction (such as the X direction) and the second direction (such as the Y direction) are perpendicular to each other.

The modulating units 11 may have the same composition. For example, each modulating unit 11 may include the first electrode 111, the second electrode 112, and the modulating medium 113, but the disclosure is not limited thereto. In some embodiments, as shown in FIG. 1, the first electrode 111 and the second electrode 112 may be located between the modulating medium 113 and the first substrate 10. For example, the first electrode 111 and the second electrode 112 may be formed by patterning the same conductive layer. A material of the conductive layer may include copper, aluminum, any material with high conductivity, or a combination thereof, but the disclosure is not limited thereto. The modulating medium 113 may include liquid crystal, such as in-plane-switching liquid crystal, but the disclosure is not limited thereto.

The first electrode 111 and the second electrode 112 are separated from each other to maintain independent electrical properties. In this way, an electric field of the modulating medium 113 may be changed by modulating a voltage difference between the first electrode 111 and the second electrode 112. A state of the modulating medium 113 may be changed by changing the electric field of the modulating medium 113, thereby changing a dielectric constant of the modulating medium 113. Therefore, the phase of the electromagnetic wave incident on the reconfigurable surface 1 may be modulated, thereby redirecting the electromagnetic wave.

A capacitor is composed of the first electrode 111, the second electrode 112, and a dielectric material (such as the modulating medium 113) sandwiched between the two. According to a formula of a parallel plate capacitor ($C=\varepsilon*A/d$), a parallel plate capacitance is directly proportional to an area of a parallel plate and is inversely proportional to a distance between the parallel plates. The larger the capacitance, the greater the adjustable amplitude of the phase of the electromagnetic wave, that is, the greater the angle range in which the electromagnetic wave is redirected. Therefore, the adjustable amplitude of the phase of the electromagnetic wave may be increased by increasing an overlapping area of the surfaces (for example, a side wall surface S111 and a side wall surface S112) opposite to each other of the first electrode 111 and the second electrode 112 or by reducing a distance DT between the first electrode 111 and the second electrode 112. For example, the overlapping area of the side wall surface S111 and the side wall surface S112 in the X direction or the Y direction may be increased by a pattern design of the first electrode 111 and the second electrode 112, thereby increasing the adjustable amplitude of the phase of the electromagnetic wave. In addition, the electromagnetic waves in different directions may be redirected by increasing the number of electrodes and an arrangement design of multiple electrodes.

Taking FIG. 2 as an example, in the top view of the reconfigurable surface 1, multiple sides of the first electrode 111 may include multiple openings AP, the modulating unit 11 may include multiple second electrodes 112, and the second electrodes 112 may be respectively disposed in the openings AP. FIG. 2 schematically shows that four sides of the first electrode 111 respectively include four openings AP, and four second electrodes 112 are respectively disposed in the four openings AP, wherein the two second electrodes 112 (the second electrodes 112 on the left and right sides in FIG. 2) are arranged along the first direction (such as the X direction), the other two second electrodes 112 (the second electrodes 112 on the upper and lower sides in FIG. 2) are arranged along the second direction (such as the Y direction), and the first direction (such as the X direction) and the second direction (such as the Y direction) are perpendicular to each other.

By the pattern design described above, the second electrode 112 is surrounded by the first electrode 111 on three sides, thereby increasing the overlapping area of the side wall surface S111 and the side wall surface S112 in the X direction or the Y direction, which helps to increase the adjustable amplitude of the phase of the electromagnetic wave or the angle range in which electromagnetic wave is redirected. In addition, by the design of the second electrodes 112 arranged along the X direction and the Y direction, when the electromagnetic wave is transmitted along the X direction, voltages of the two second electrodes 112 arranged along the X direction may be adjusted, so that there is a voltage difference between the two second electrodes 112 arranged along the X direction and the first electrode 111 to drive the liquid crystal to rotate to change the phase of the electromagnetic wave transmitted along the X direction, thereby achieving redirection. On the other hand, when the electromagnetic wave is transmitted along the Y direction, voltages of the two second electrodes 112 arranged along the Y direction may be adjusted, so that there is a voltage difference between the two second electrodes 112 arranged along the Y direction and the first electrode 111 to drive the liquid crystal to rotate to change the phase of the electromagnetic wave transmitted along the Y direction, thereby achieving redirection.

Referring to FIG. 3, compared to increasing a thickness T111 of the first electrode 111 and a thickness T112 of the second electrode 112 to increase the overlapping area of the side wall surface S111 and the side wall surface S112 in the X direction or the Y direction, the pattern design described above helps to reduce a thickness T113 (for example, a maximum thickness) of the modulating medium 113 in the Z direction and helps to reduce an amount of the modulating medium 113 used, which reduces the difficulty of the process in addition to saving production costs. For example, the thickness T113 of the modulating medium 113 may be less than 100 micrometers, such as a few micrometers.

The ground signal layer 12 may be configured to reduce signal interference. For example, a material of the ground signal layer 12 may include copper, aluminum, any material with high conductivity, or a combination thereof, but the disclosure is not limited thereto.

According to different requirements, the reconfigurable surface 1 may further include other elements or film layers. For example, the reconfigurable surface 1 may further include a cover plate 13 to protect elements located thereunder. The cover plate 13 is disposed on the modulating units 11. For example, the cover plate 13 may include a glass substrate, a polymer film, or a combination thereof, but the disclosure is not limited thereto.

Figure 4:
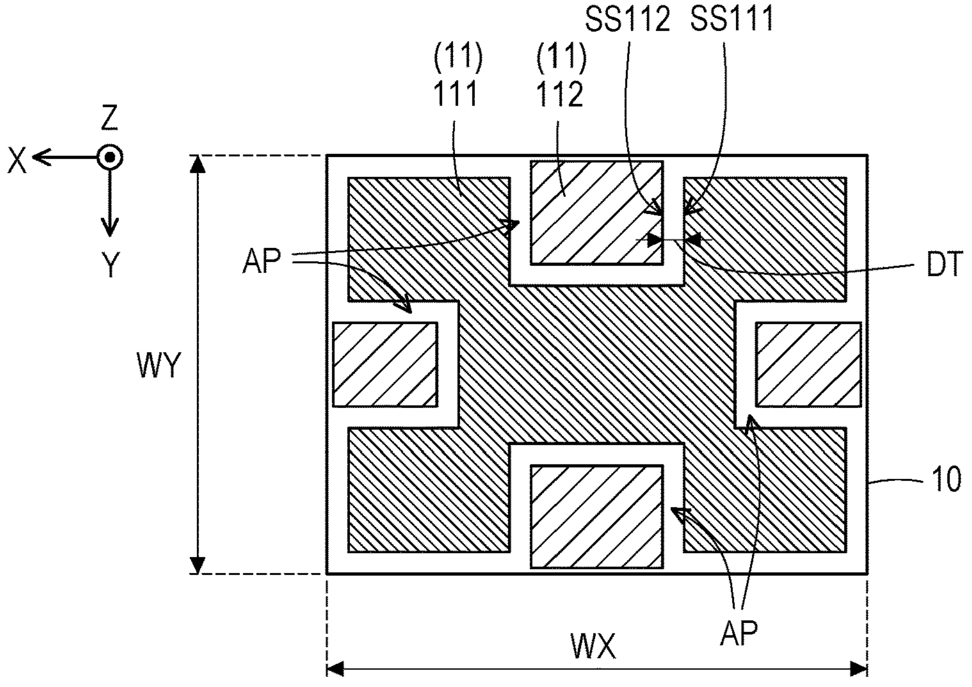
FIG. 4 to FIG. 7 are schematic top views of other types of reconfigurable surfaces according to the first embodiment.

In the embodiment described above, the modulating unit 11 may have a symmetrical structure, wherein a width WX of the modulating unit 11 in the X direction is the same as a width WY of the modulating unit 11 in the Y direction, and the four second electrodes 112 have the same size, as shown in FIG. 2. Under this architecture, the frequency, the phase, and intensity of the electromagnetic wave in the X direction and the Y direction are the same, but the disclosure is not limited thereto. Alternatively, the modulating unit may have an asymmetric structure to achieve redirection of the two different directions. As shown in FIG. 4, the width WX of the modulating unit 11 in the X direction may be different from the width WY of the modulating unit 11 in the Y direction. In addition, a size of the two second electrodes 112 arranged along the X direction may be different from a size of the two second electrodes 112 arranged along the Y direction (the overlapping area of the side wall surface S111 and the side wall surface S112 is changed). For example, the size of the two second electrodes 112 arranged along the X direction may be smaller than the size of the two second electrodes 112 arranged along the Y direction, but the disclosure is not limited thereto.

Figure 5:
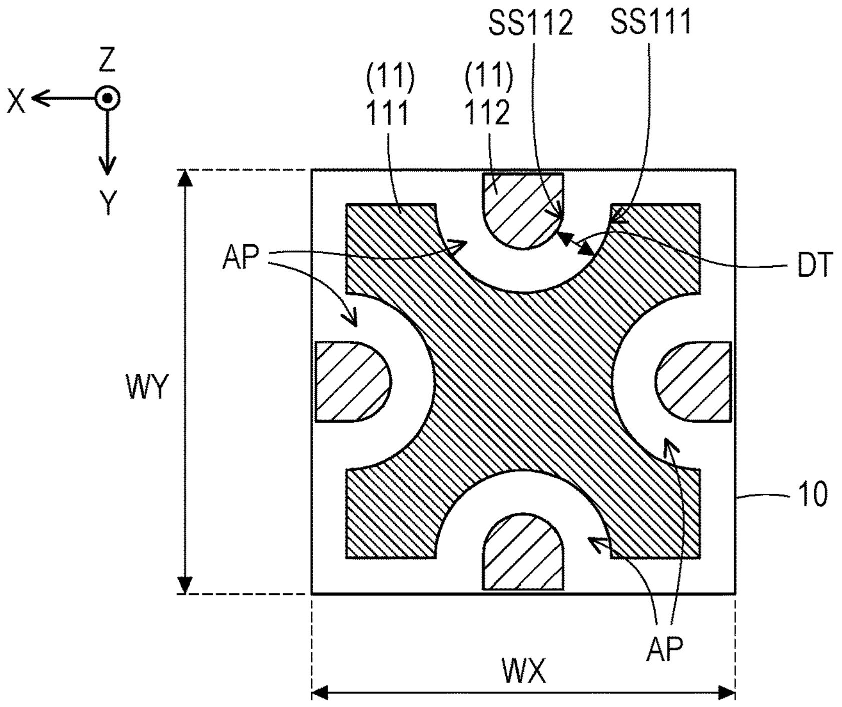

Alternatively, as shown in FIG. 5, the opening AP of the first electrode 111 may be a semicircle. The semicircle generally refers to a portion of a circle, but is not limited to half of the circle. In addition, an end of the second electrode 112 adjacent to the first electrode 111 may be arc-shaped, but the disclosure is not limited thereto.

Figure 6:
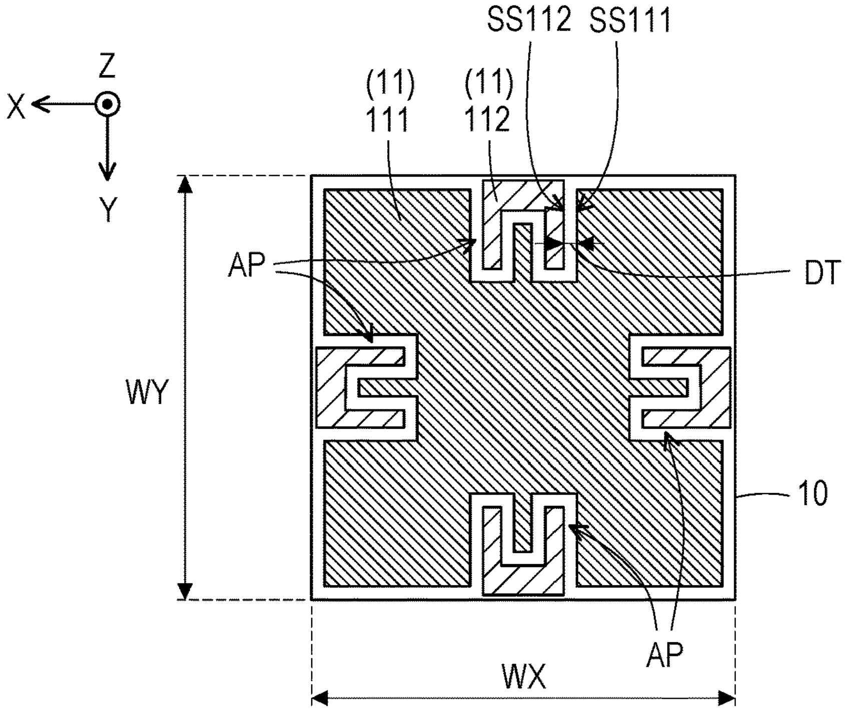

Alternatively, as shown in FIG. 6, the opening AP of the first electrode 111 may be W-shaped, and the second electrode 112 may be U-shaped to further increase the adjustable amplitude of the phase of the electromagnetic wave, but the disclosure is not limited thereto.

It should be understood that in the top view of the reconfigurable surface, the shapes of the first electrode 111 and the second electrode 112 or the shape of the opening AP may be changed according to actual requirements and are not limited as that shown in FIG. 2 or FIG. 4 to FIG. 6. In addition, the modulating unit in any embodiment of the disclosure may adopt a design of the asymmetric structure, which is not described again hereinafter.

Figure 7:
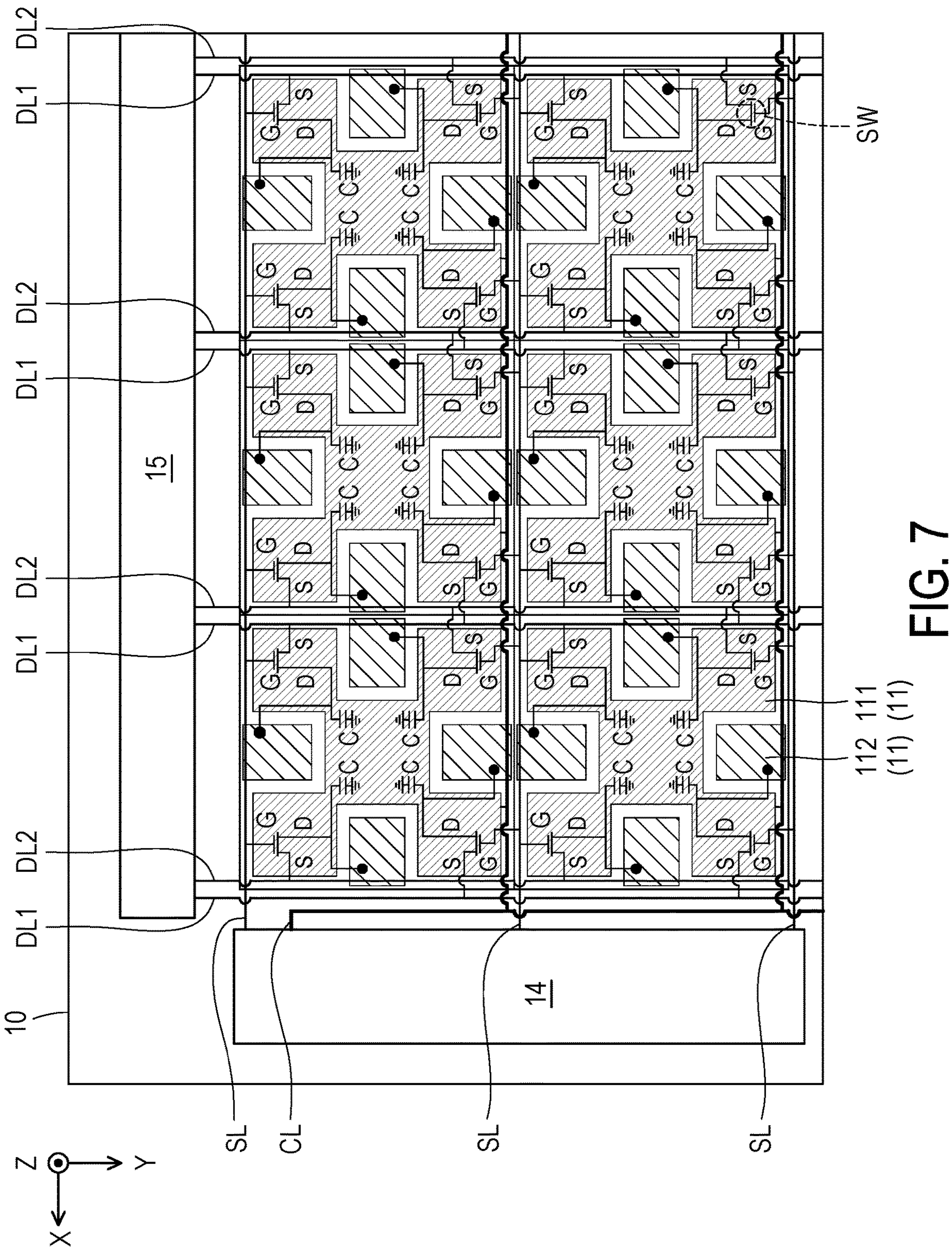

As shown in FIG. 7, the reconfigurable surface may also include a first driver circuit 14, a second driver circuit 15, multiple switching elements SW, multiple storage capacitors C, multiple scanning lines SL, multiple data lines (such as multiple data lines DL1 and multiple data lines DL2), and multiple common electrode lines CL, but the disclosure is not limited thereto.

The modulating units 11 are arranged in the array in the X direction and the Y direction. The first driver circuit 14 and the second driver circuit 15 are respectively disposed on two adjacent sides of the array, such as the left side and the upper side, but the disclosure is not limited thereto. The first driver circuit 14 and the second driver circuit 15 are, for example, a gate driver circuit and a source driver circuit respectively, but the disclosure is not limited thereto.

The switching elements SW and the storage capacitors C are disposed corresponding to the modulating units 11. Taking FIG. 7 as an example, each modulating unit 11 is disposed corresponding to four switching elements SW and four storage capacitors C, but the disclosure is not limited thereto. Each switching element SW includes, for example, a gate G, a source S, and a drain D, but the disclosure is not limited thereto. Each gate G is electrically connected to a corresponding scanning line SL, each source S is electrically connected to a corresponding data line, and each drain D is electrically connected to a corresponding second electrode 112 and a corresponding storage capacitor C.

The scanning lines SL are electrically connected to the first driver circuit 14, and the scanning lines SL extend from the first driver circuit 14 toward the array and are electrically connected to multiple gates G. Taking FIG. 7 as an example, each modulating unit 11 is located between the two adjacent scanning lines SL. In each modulating unit 11, the four second electrodes 112 are electrically connected to the two adjacent scanning lines SL. For example, one of the two second electrodes 112 arranged along the X direction and one of the two second electrodes 112 arranged along the Y direction are electrically connected to one of the two adjacent scanning lines SL, and the other one of the two second electrodes 112 arranged along the X direction and the other one of the two second electrodes 112 arranged along the Y direction are electrically connected to the other one of the two adjacent scanning lines SL.

The data lines (such as the data lines DL1 and the data lines DL2) are electrically connected to the second driver circuit 15, and the data lines extend from the second driver circuit 15 toward the array and are electrically connected to multiple sources S. Taking FIG. 7 as an example, the data lines DL1 and the data lines DL2 are arranged alternately in the X direction, and two data lines (including one data line DL1 and one data line DL2) are disposed on the left and right sides of each modulating unit 11. In each modulating unit 11, the four second electrodes 112 are electrically connected to the four adjacent data lines (including two data lines DL1 and two data lines DL2) respectively. For example, the two second electrodes 112 arranged along the X direction are electrically connected to the two data lines DL2 on the left and right sides of the modulating unit 11 respectively, and the two second electrodes 112 arranged along the Y direction are electrically connected to the two data lines DL1 on the left and right sides of the modulating unit 11 respectively.

The common electrode lines CL are electrically connected to the first driver circuit 14, and the common electrode lines CL extend from the first driver circuit 14 toward the array and are electrically connected to multiple first electrodes 111. For the convenience in identification, the common electrode line CL is shown thicker than the scanning line SL and the data line in FIG. 7, but the actual line widths of these conducting lines may be changed according to requirements and are not limited as that shown in in FIG. 7.

The scanning lines SL, the data lines (such as the data lines DL1 and the data lines DL2), and the common electrode lines CL may be different conductive layers respectively and may be electrically insulated from each other by multiple insulating layers (not shown). The materials of the scanning lines SL, the data lines (such as the data lines DL1 and the data lines DL2), and the common electrode lines CL may include copper, aluminum, any material with high conductivity, or a combination thereof, but the disclosure is not limited thereto.

As shown in FIG. 8, in some embodiments, the reconfigurable surface may further include a second substrate 16 opposite to the first substrate 10, and the ground signal layer 12 is located between the first substrate 10 and the second substrate 16. Specifically, the modulating units 11 and the ground signal layer 12 may be respectively formed on the first substrate 10 and the second substrate 16 and may be connected to each other by a welding part 17. For example, the welding part 17 may include a solder ball, a copper pillar, other suitable metals, or a metal alloy, but the disclosure is not limited thereto.

Taking FIG. 8 as an example, the reconfigurable surface may include a modulating structure ST1, a circuit structure ST2, and the welding part 17, and the modulating structure ST1 and the circuit structure ST2 are joined to each other by the welding part 17. The modulating structure ST1 may include the first substrate 10, the modulating units 11, the cover plate 13, an alignment layer AL1, an alignment layer AL2, multiple spacers SP, multiple conducting lines L1, multiple pads P1, and an insulating layer IN1. The circuit structure ST2 may include the second substrate 16, an insulating layer IN2, the common electrode lines CL (only one is schematically shown), an insulating layer IN3, the scanning lines SL (only one is schematically shown), an insulating layer IN4, the data lines (such as the data lines DL1 and the data lines DL2; only one is schematically shown), an insulating layer IN5, the ground signal layer 12, multiple conducting lines L2, an insulating layer IN6, multiple conducting lines L3, an insulating layer IN7, multiple conducting lines L4, an insulating layer IN8, multiple conducting lines L5, multiple pads P2, and an insulating layer IN9.

The modulating units 11 are disposed on a surface of the first substrate 10 facing the cover plate 13, and the alignment layer AL1 is disposed on the modulating units 11. The spacers SP are disposed on a surface of the cover plate 13 facing the first substrate 10 to maintain a distance between the first substrate 10 and the cover plate 13. The alignment layer AL2 covers the spacers SP and the cover plate 13. The modulating medium 113 is disposed between the alignment layer AL1 and the alignment layer AL2. The first substrate 10 has multiple through holes TH. The through holes TH are respectively disposed corresponding to the first electrode 111 and the second electrode 112. The conducting lines L1 are disposed in the through holes TH and under the first substrate 10. A material of the conducting lines L1 may include copper, aluminum, titanium, any material with high conductivity, or a combination thereof, but the disclosure is not limited thereto. The pads P1 are respectively disposed under the conducting lines L1 and are electrically connected to the conducting lines L1. A material of the pads P1 may include electroless nickel-gold, but the disclosure is not limited thereto. The insulating layer IN1 is disposed under the first substrate 10 and the conducting lines L1 and exposes the pads P1, so that the welding parts 17 may be respectively connected to the pads P1. A material of the insulating layer IN1 may include an inorganic insulating material, such as silicon nitride (SiNx), silicon oxide (SiOx), or a combination thereof, but the disclosure is not limited thereto.

The insulating layer IN2, the common electrode lines CL, the insulating layer IN3, the scanning lines SL, the insulating layer IN4, the data lines (such as the data line DL1 and the data line DL2), and the insulating layer IN5 are sequentially disposed on the second substrate 16. For the materials of the insulating layer IN2, the insulating layer IN3, the insulating layer IN4, and the insulating layer IN5, reference may be made to the material of the insulating layer IN1, which is not repeated here. The ground signal layer 12 and the conducting lines L2 are disposed on the insulating layer IN5 and are separated from each other. At least one of the conducting lines L2 may penetrate the insulating layer IN5 and may be electrically connected to the corresponding data line (such as the data line DL1 or the data line DL2). At least another one of the conducting lines L2 may penetrate the insulating layer IN3, the insulating layer IN4, and the insulating layer IN5 and may be electrically connected to the corresponding common electrode line CL. For the material of the conducting lines L2, reference may be made to the material of the conducting lines L1, which is not repeated here. The insulating layer IN6, the conducting lines L3, the insulating layer IN7, the conducting lines L4, the insulating layer IN8, and the conducting lines L5 are sequentially disposed on the ground signal layer 12 and the conducting lines L2. The materials of the insulating layer IN6, the insulating layer IN7, and the insulating layer IN8 may include photosensitive polyimide (PSPI) or tetrafluoroethylene-perfluoroalkyl vinyl ether copolymer (PFA), but the disclosure is not limited thereto. The conducting lines L3 are electrically connected to the conducting lines L2 respectively, the conducting lines L4 are electrically connected to the conducting lines L3 respectively, and the conducting lines L5 are electrically connected to the conducting lines LA respectively. For the materials of the conducting lines L3, the conducting lines LA, and the conducting lines L5, reference may be made to the material of the conducting lines L1, which is not repeated here. The pads P2 are respectively disposed on the conducting lines L5 and are electrically connected to the conducting lines L5. For a material of the pads P2, reference may be made to the material of the pads P1, which is not repeated here. The insulating layer IN9 is disposed on the conducting lines L5 and the insulating layer IN8 and exposes the pads P2, so that the welding parts 17 may be respectively connected to the pads P2. For a material of the insulating layer IN9, reference may be made to the material of the insulating layer IN1, which is not repeated here.

Referring to FIG. 9, a manufacturing method of the reconfigurable surface may include forming a modulating structure (Step 900), forming a circuit structure (Step 902), and joining the modulating structure to the circuit structure by the welding part (Step 904). Taking FIG. 8 as an example, forming the modulating structure ST1 may include providing the first substrate 10, forming the first electrode 111 and the second electrode 112 on the first substrate 10, and forming the modulating medium 113 between the first electrode 111 and the second electrode 112. Forming the circuit structure ST2 includes providing the second substrate 16 and forming the ground signal layer 12 on the second substrate 16.

In FIG. 9, Step 900 of forming the modulating structure precedes Step 902 of forming the circuit structure, but the order of the two steps may be reversed. In addition, under the architecture of FIG. 8, forming the modulating structure ST1 may further include forming the through holes TH (for example, by mechanical chiseling, laser drilling, or other adaptable methods) in the first substrate 10, forming the conducting lines L1 in the through holes TH and under the first substrate 10, and electrically connecting the first electrode 111 and the second electrode 112 to the circuit structure ST2 by the conducting lines L1 and the welding part 17.

Moreover, forming the modulating structure ST1 may further include forming the pads P1 and the insulating layer IN1 under the conducting lines L1 and electrically connecting the first electrode 111 and the second electrode 112 to the circuit structure ST2 by the pads P1. Specifically, in FIG. 8, the first electrode 111 is electrically connected to the common electrode line CL, for example, by the conducting line L1, the pad P1, the welding part 17, the pad P2, the conducting line L5, the conducting line LA, the conducting line L3, and the conducting line L2. In addition, the second electrode 112 is electrically connected to the data line DL1 or the data line DL2, for example, by the conducting line L1, the pad P1, the welding part 17, the pad P2, the conducting line L5, the conducting line L4, the conducting line L3, and the conducting line L2. It should be understood that FIG. 8 only schematically shows one possible structure of the reconfigurable surface, but the reconfigurable surface may add or reduce one or multiple elements or film layers according to actual requirements.

In addition, under the architecture of FIG. 8, the step of forming the circuit structure ST2 may further include forming the insulating layer IN2, the common electrode lines CL (only one is schematically shown), the insulating layer IN3, the scanning lines SL (only one is schematically shown), the insulating layer IN4, the data lines (such as the data lines DL1 and the data lines DL2; only one is schematically shown), the insulating layer IN5, the conducting lines L2, the insulating layer IN6, the conducting lines L3, the insulating layer IN7, the conducting lines L4, the insulating layer IN8, the conducting lines L5, the pads P2, and the insulating layer IN9 on the second substrate 16. For the relevant description of the film layers described above, reference may be made to the aforementioned description, which is not repeated here.

Figure 10:
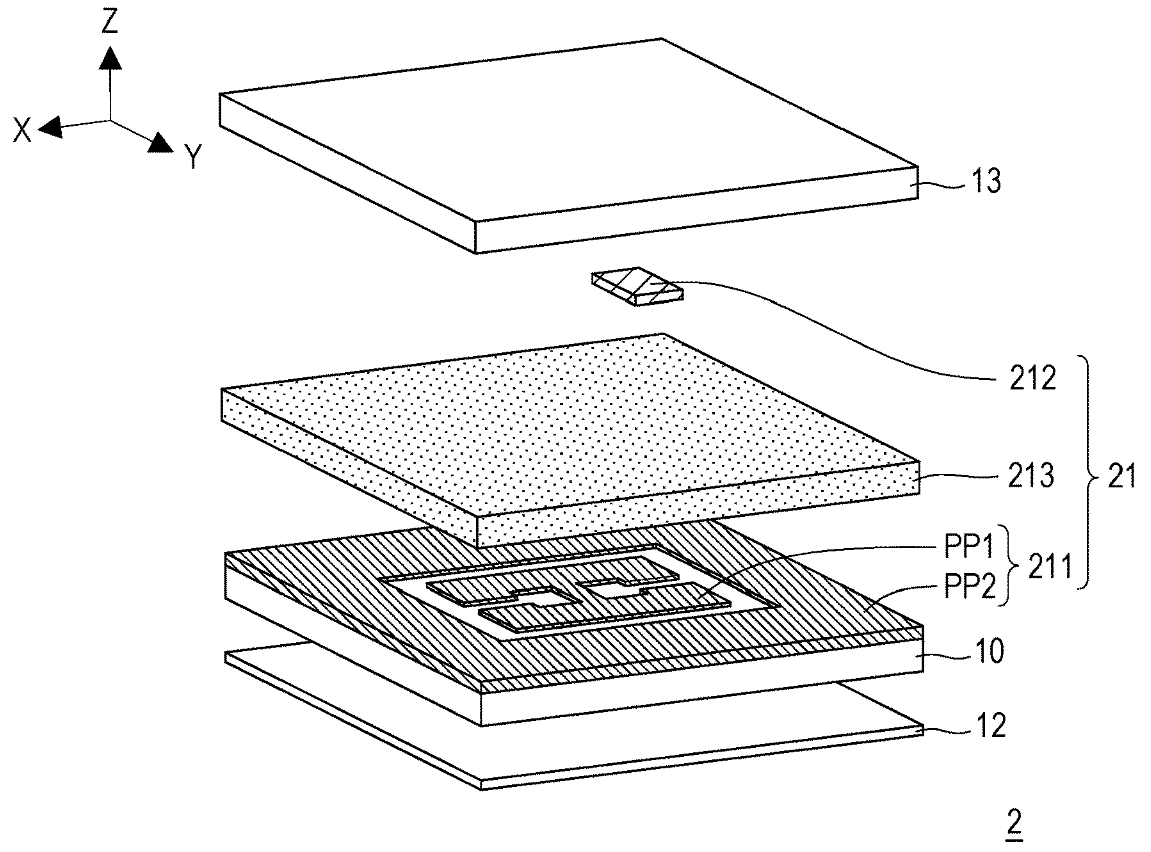
FIG. 10 is a partial schematic exploded view of a reconfigurable surface according to a second embodiment of the disclosure.
Figure 11:
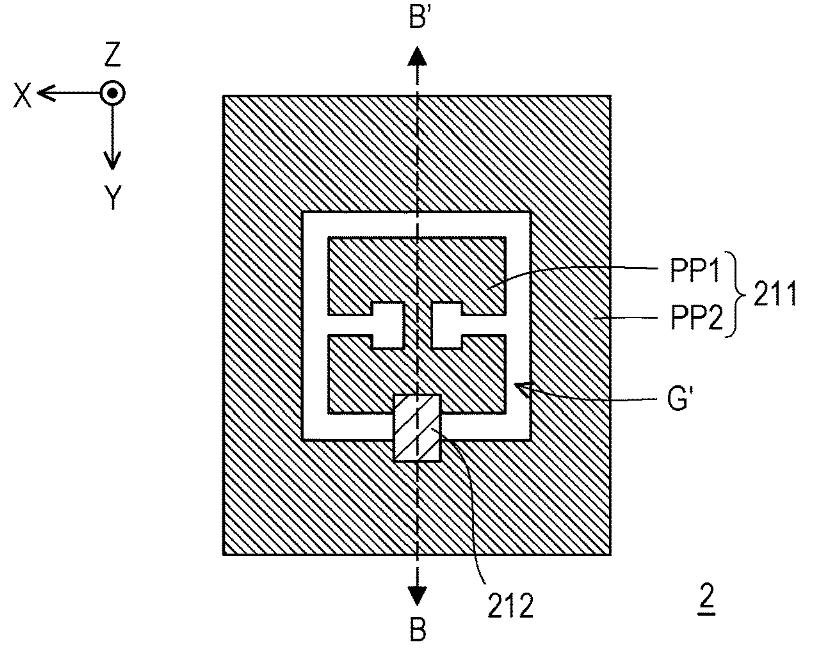
FIG. 11 is a schematic top view of the reconfigurable surface in FIG. 10.
Figure 12:
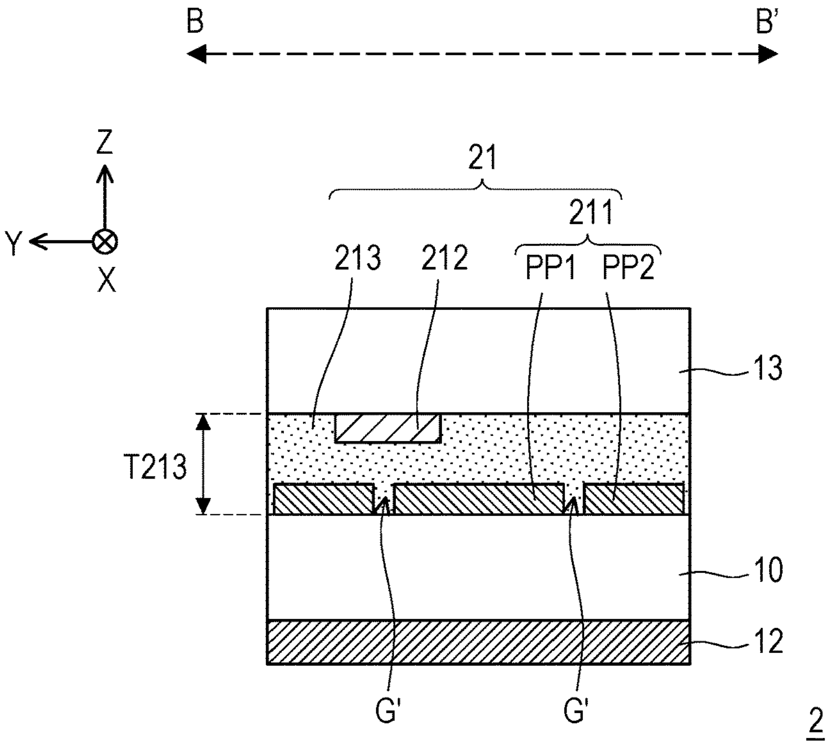
FIG. 12 is a schematic cross-sectional view corresponding to a sectional line B-B' in FIG. 11.
Figure 13:
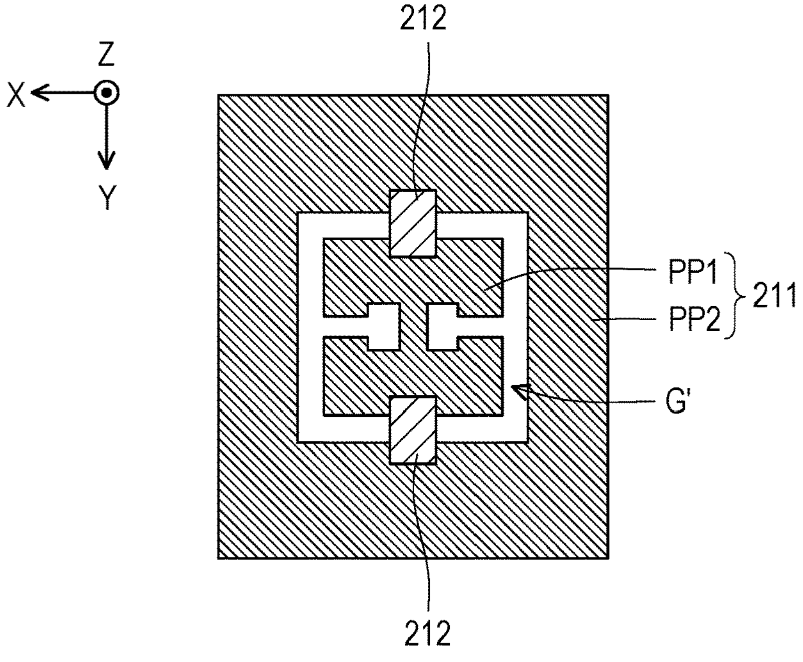
FIG. 13 and FIG. 14 are schematic top views of other types of reconfigurable surfaces according to the second embodiment.
Figure 14:
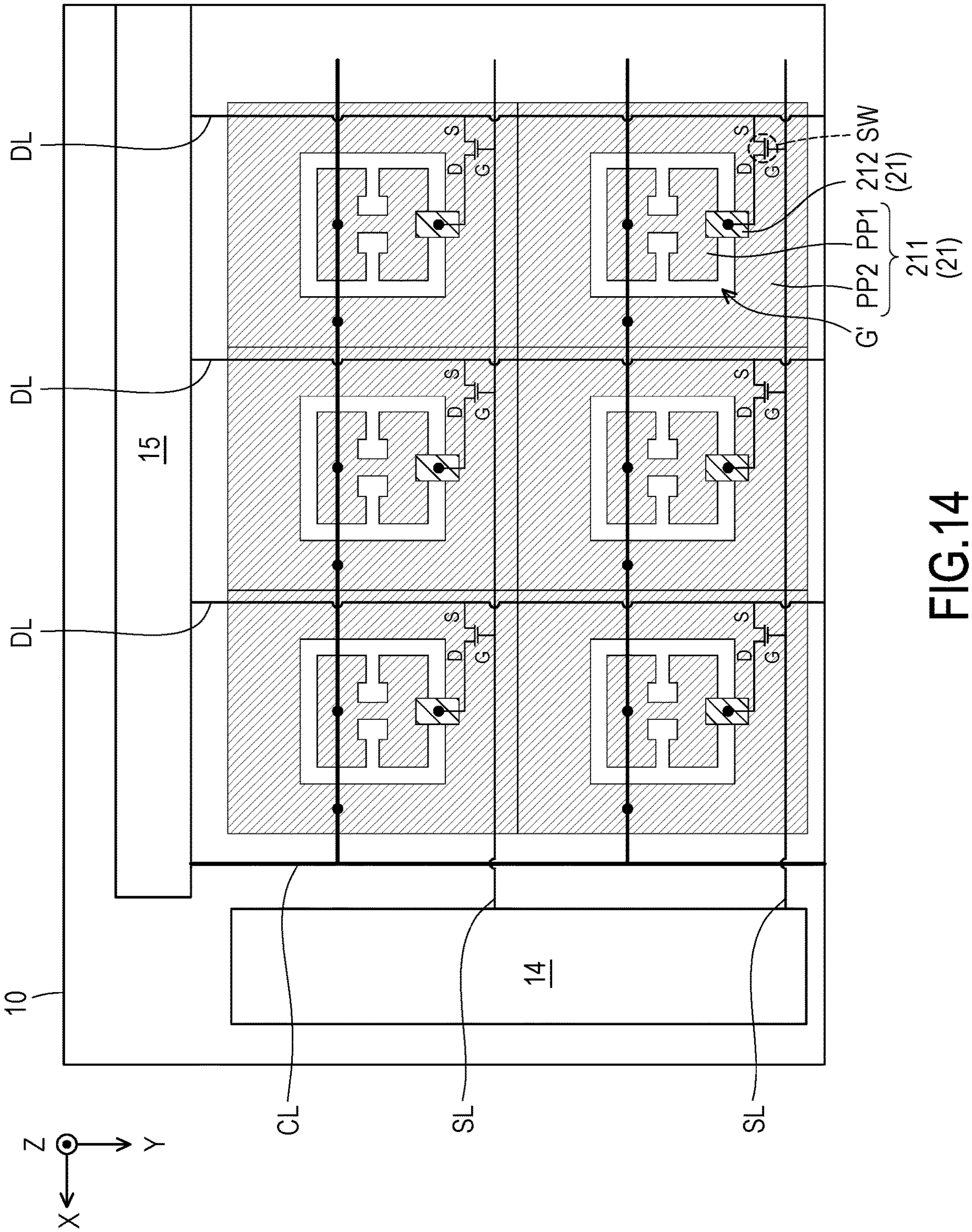
Figure 15:
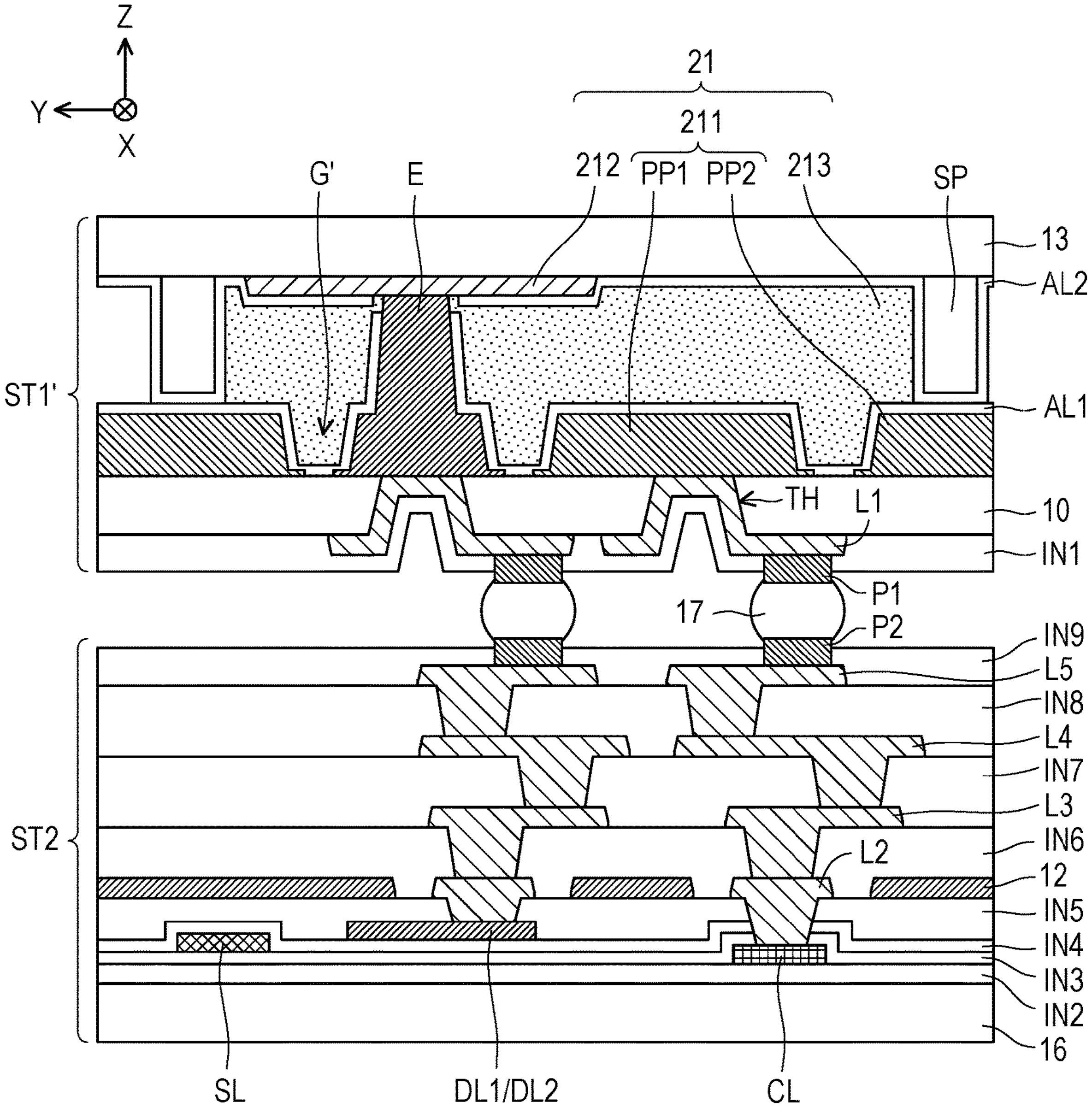
FIG. 15 is a partial schematic cross-sectional view of other types of reconfigurable surfaces according to the second embodiment.

FIG. 10 is a partial schematic exploded view of a reconfigurable surface according to a second embodiment of the disclosure. FIG. 11 is a schematic top view of the reconfigurable surface in FIG. 10. FIG. 12 is a schematic cross-sectional view corresponding to a sectional line B-B' in FIG. 11. FIG. 13 and FIG. 14 are schematic top views of other types of reconfigurable surfaces according to the second embodiment. FIG. 15 is a partial schematic cross-sectional view of other types of reconfigurable surfaces according to the second embodiment.

Referring to FIG. 10 to FIG. 12, a main difference between a reconfigurable surface 2 and the reconfigurable surface 1 in FIG. 1 to FIG. 3 lies in a design of a modulating unit 21. Specifically, in the modulating unit 21, a modulating medium 213 is located between the first electrode 211 and the second electrode 212. The modulating medium 213 is, for example, electrically controllable birefringence (ECB) liquid crystal. In addition, the first electrode 211 includes a first portion PP1 and a second portion PP2 surrounding the first portion PP1. There is a gap G' between the second portion PP2 and the first portion PP1. The second electrode 212 overlaps with the partial first portion PP1, the partial second portion PP2, and the partial gap G'. For example, in the top view of the reconfigurable surface 2, as shown in FIG. 11, the shape of the first portion PP1 may be I-shaped. The gap G' surrounds the first portion PP1 and separates the first portion PP1 from the second portion PP2. The electrode 212 crosses the gap G' in the Y direction and partially overlaps with the first portion PP1 and the second portion PP2. By the design described above, when the electromagnetic wave is transmitted along the Y direction, a voltage of the second electrode 212 may be adjusted, so that there is a voltage difference between the second electrode 212 and the first electrode 211 to drive the liquid crystal to rotate to change the phase of the electromagnetic wave transmitted along the Y direction, thereby achieving redirection. In addition, as shown in FIG. 12, the pattern design described above helps to reduce a thickness T213 (for example, a maximum thickness) of the modulating medium 213 in the Z direction and helps to reduce an amount of the modulating medium 213 used. For example, the thickness T213 of the modulating medium 213 may be less than 100 micrometers, such as a few micrometers.

It should be understood that FIG. 10 to FIG. 12 only schematically show one implementation form of the first electrode 211 and the second electrode 212, but the design parameters (such as shape, size, quantity, relative configuration relationship, and so on) of the first electrode 211 and the second electrode 212 may be changed according to actual requirements and are not limited as that shown in FIG. 10 to FIG. 12. For example, as shown in FIG. 13, the modulating unit 21 may include two second electrodes 212, and the two second electrodes 212 are, for example, arranged at two opposite ends of the first electrode 211 along the Y direction.

As shown in FIG. 14, the reconfigurable surface may further include the first driver circuit 14, the second driver circuit 15, the switching elements SW, the scanning lines SL, the data lines DL, and the common electrode lines CL, but the disclosure is not limited thereto.

Multiple modulating units 21 are arranged in an array in the X direction and the Y direction. The first driver circuit 14 and the second driver circuit 15 are respectively disposed on two adjacent sides, such as the left side and the upper side, of the array, but the disclosure is not limited thereto. The first driver circuit 14 and the second driver circuit 15 are, for example, a gate driver circuit and a source driver circuit respectively, but the disclosure is not limited thereto.

The switching elements SW are disposed corresponding to the modulating units 21. Taking FIG. 14 as an example, each modulating unit 21 is disposed corresponding to one switching element SW, but the disclosure is not limited thereto. Each switching element SW includes, for example, the gate G, the source S, and the drain D, but the disclosure is not limited thereto. Each gate G is electrically connected to the corresponding scanning line SL, each source S is electrically connected to the corresponding data line, and each drain D is electrically connected to the corresponding second electrode 212.

The scanning lines SL are electrically connected to the first driver circuit 14, and the scanning lines SL extend from the first driver circuit 14 toward the array and are electrically connected to the gates G. Taking FIG. 14 as an example, the modulating units 21 arranged along the X direction may be electrically connected to the same scanning line SL, and the modulating units 21 arranged along the Y direction may be electrically connected to different scanning lines SL.

The data lines DL are electrically connected to the second driver circuit 15, and the data lines DL extend from the second driver circuit 15 toward the array and are electrically connected to the sources S. Taking FIG. 14 as an example, the modulating units 21 arranged along the Y direction may be electrically connected to the same data line DL, and the modulating units 21 arranged along the X direction are electrically connected to different data lines DL.

The common electrode lines CL are electrically connected to the second driver circuit 15, and the common electrode lines CL extend from the second driver circuit 15 toward the array and are electrically connected to the first electrodes 211 (including multiple first portions PP1 and multiple second portions PP2). For convenience in identification, the common electrode line CL is shown thicker than the scanning line SL and the data line DL in FIG. 14, but the actual line widths of these conducting lines may be changed according to requirements and are not limited as that shown in FIG. 14.

The scanning lines SL, the data lines DL, and the common electrode lines CL may be different conductive layers respectively and may be electrically insulated from each other by the insulating layers (not shown). The materials of the scanning lines SL, the data lines DL, and the common electrode lines CL may include copper, aluminum, any material with high conductivity, or a combination thereof, but the disclosure is not limited thereto.

As shown in FIG. 15, in some embodiments, the reconfigurable surface may further include a modulating structure ST1', the circuit structure ST2, and the welding part 17. A main difference between the modulating structure ST1' and the modulating structure ST1 in FIG. 8 is explained below. In the modulating structure ST1', the modulating medium 213 is located between the first electrode 211 and the second electrode 212 (for example, the second electrode 212 may be disposed on the surface of the cover plate 13 facing the first substrate 10). The first electrode 211 includes the first portion PP1 and the second portion PP2 surrounding the first portion PP1. There is a gap G' between the second portion PP2 and the first portion PP1. Under this architecture, forming the modulating structure ST1' further includes forming a conductive member E in the gap G', and the second electrode 212 is electrically connected to the circuit structure ST2 by the conductive member E, at least one of the conducting lines L1, and the welding part 17. In addition, the alignment layer AL1 not only covers the first electrode 211, but also covers the partial conductive member E, and the alignment layer AL1 exposes an end of the conductive member E adjacent to the second electrode 212, so that the conductive member E may be electrically connected to the second electrode 212. Similarly, the alignment layer AL2 not only covers the spacers SP and the surface of the cover plate 13 facing the first substrate 10, but also covers the partial second electrode 212, and the alignment layer AL2 exposes a portion of the second electrode 212 adjacent to the conductive member E, so that the second electrode 212 may be electrically connected to the conductive member E.

Based on the above, in the embodiments of the disclosure, the phase of the electromagnetic wave incident on the reconfigurable surface may be electronically modulated by the design of the modulating unit, thereby redirecting the electromagnetic wave.

The above embodiments are used to describe the technical solution of the disclosure instead of limiting it. Although the disclosure has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the disclosure.

Although the embodiments of the disclosure and their advantages are disclosed as above, it should be understood that those skilled in the art, without departing from the spirit and scope of the disclosure, may make changes, substitutions, and modifications, and features between the embodiments may be mixed and replaced at will to form other new embodiments. In addition, the scope of the disclosure is not limited to the manufacturing processes, machines, manufactures, material compositions, devices, methods, and steps in the specific embodiments described in the specification. Those skilled in the art may understand the current or future development processes, machines, manufactures, material compositions, devices, methods, and steps from the content of the disclosure, which may all be adopted according to the disclosure as long as they may implement substantially the same function or obtain substantially the same result in an embodiment described here. Therefore, the scope of the disclosure includes the above manufacturing processes, machines, manufactures, material compositions, devices, methods, and steps. In addition, each claim constitutes an individual embodiment, and the scope of the disclosure also includes the combination of each claim and embodiment. The scope of the disclosure shall be subject to the scope defined by the appended claims.

What is claimed is:

1. A reconfigurable surface, configured to modulate a phase of an electromagnetic wave, comprising:
- a first substrate;
- a plurality of modulating units, disposed on the first substrate, wherein one of the plurality of modulating units comprises:
  - a first electrode, disposed on the first substrate;
  - a plurality of second electrodes, disposed adjacent to the first electrode; and
  - a modulating medium, located between the first electrode and the plurality of second electrodes; and
  - a ground signal layer, disposed under the first substrate,
  - wherein the first electrode and the plurality of second electrodes are located between the modulating medium and the first substrate, and
  - wherein in a top view of the reconfigurable surface, a plurality of sides of the first electrode respectively comprise a plurality of openings, and the plurality of second electrodes are respectively disposed in the plurality of openings.

2. The reconfigurable surface according to claim 1, wherein two of the plurality of second electrodes are arranged along a first direction, another two of the plurality of second electrodes are arranged along a second direction, and the first direction and the second direction are perpendicular to each other.

3. The reconfigurable surface according to claim 1, wherein the modulating medium comprises in-plane-switching liquid crystal.

4. The reconfigurable surface according to claim 1, wherein the modulating medium covers the first electrode and the plurality of second electrodes.

5. The reconfigurable surface according to claim 1, further comprising:
- a second substrate, opposite to the first substrate, wherein the ground signal layer is located between the first substrate and the second substrate.

6. The reconfigurable surface according to claim 5, further comprising:
- a welding part, wherein the first substrate and the second substrate are joined to each other by the welding part.

7. The reconfigurable surface according to claim 1, wherein the first electrode is electrically connected to a common electrode line.

8. A reconfigurable surface, configured to modulate a phase of an electromagnetic wave, comprising:
- a first substrate;

a plurality of modulating units, disposed on the first substrate, wherein one of the plurality of modulating units comprises:
a first electrode, disposed on the first substrate;
a second electrode, disposed adjacent to the first electrode; and
a modulating medium, located between the first electrode and the second electrode; and
a ground signal layer, disposed under the first substrate,
wherein the modulating medium is located between the first electrode and the second electrode in a thickness direction of the first substrate, and
wherein the first electrode comprises a first portion and a second portion surrounding the first portion, there is a gap between the second portion and the first portion, and the second electrode overlaps with the partial first portion, the partial second portion, and the partial gap.

9. The reconfigurable surface according to claim 8, wherein the modulating medium comprises electrically controllable birefringence liquid crystal.

10. A manufacturing method of a reconfigurable surface, wherein the reconfigurable surface is configured to modulate a phase of an electromagnetic wave, and the manufacturing method of the reconfigurable surface comprises:
forming a modulating structure, comprising:
providing a first substrate;
forming a first electrode and a second electrode on the first substrate; and
forming a modulating medium between the first electrode and the second electrode;
forming a circuit structure, comprising:
providing a second substrate; and
forming a ground signal layer on the second substrate; and
joining the modulating structure to the circuit structure by a welding part,
wherein forming the modulating structure further comprises:
forming a plurality of through holes in the first substrate; and
forming a plurality of conducting lines in the plurality of through holes and under the first substrate, wherein the first electrode and the second electrode are electrically connected to the circuit structure by the plurality of conducting lines and the welding part.

11. The manufacturing method of the reconfigurable surface according to claim 10, wherein the modulating medium is located between the first electrode and the second electrode, the first electrode comprises a first portion and a second portion surrounding the first portion, there is a gap between the second portion and the first portion, and forming the modulating structure further comprises:
forming a conductive member in the gap, wherein the second electrode is electrically connected to the circuit structure by the conductive member, at least one of the plurality of conducting lines, and the welding part.

12. The manufacturing method of the reconfigurable surface according to claim 11, wherein a thickness of the conductive member is greater than a thickness of the first electrode and a thickness of the second electrode.

13. The manufacturing method of the reconfigurable surface according to claim 10, wherein forming the first electrode and the second electrode on the first substrate is earlier than forming the modulating medium between the first electrode and the second electrode.

14. The manufacturing method of the reconfigurable surface according to claim 13, wherein the modulating medium comprises in-plane-switching liquid crystal.

15. The manufacturing method of the reconfigurable surface according to claim 10, wherein forming the first electrode and the second electrode on the first substrate and forming the modulating medium between the first electrode and the second electrode comprise:
forming the first electrode and the second electrode on the first substrate and a cover plate respectively;
joining the first substrate to the cover plate; and
filling the modulating medium between the first substrate and the cover plate.

16. The manufacturing method of the reconfigurable surface according to claim 15, wherein the modulating medium comprises electrically controllable birefringence liquid crystal.

* * * * *